United States Patent
Liu et al.

(10) Patent No.: US 12,437,780 B2
(45) Date of Patent: Oct. 7, 2025

(54) DFL TDMR MIDDLE SHIELD THROAT HEIGHT CONTROL FOR IMPROVED STABILITY

(71) Applicant: Western Digital Technologies, Inc., San Jose, CA (US)

(72) Inventors: Xiaoyong Liu, San Jose, CA (US); Zhanjie Li, Pleasanton, CA (US); Yaguang Wei, Pleasanton, CA (US); Yukimasa Okada, Cupertino, CA (US); Goncalo Marcos Baião De Albuquerque, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 63 days.

(21) Appl. No.: 18/243,053

(22) Filed: Sep. 6, 2023

(65) Prior Publication Data
US 2025/0078864 A1   Mar. 6, 2025

(51) Int. Cl.
G11B 5/39  (2006.01)

(52) U.S. Cl.
CPC .......... *G11B 5/3912* (2013.01); *G11B 5/3909* (2013.01); *G11B 5/3932* (2013.01); *G11B 5/3954* (2013.01); *G11B 5/398* (2013.01); G11B 2005/3996 (2013.01)

(58) Field of Classification Search
None
See application file for complete search history.

(56) References Cited

U.S. PATENT DOCUMENTS

| | | | | |
|---|---|---|---|---|
| 7,486,459 B1* | 2/2009 | Schreck et al. | ...... | G11B 5/3133 360/234.4 |
| 7,538,976 B2* | 5/2009 | Hsiao et al. | ............ | G11B 5/11 360/125.02 |
| 7,684,149 B2* | 3/2010 | Mochizuki et al. | . | G11B 5/3967 360/125.3 |
| 7,715,152 B2* | 5/2010 | Okada et al. | ............. | G11B 5/11 360/319 |
| 7,894,159 B2* | 2/2011 | Lengsfield, III et al. | ................... | G11B 5/11 360/125.03 |
| 8,189,303 B2* | 5/2012 | Hara et al. | ........... | G11B 5/3912 360/319 |

(Continued)

OTHER PUBLICATIONS

Wood, Roger, "Shingled Magnetic Recording (SMR) and Two-Dimensional Magnetic Recording (TDMR)", Journal of Magnetism and Magnetic Materials, Nov. 2022, vol. 561, pp. 1-5.

*Primary Examiner* — Craig A. Renner
(74) *Attorney, Agent, or Firm* — Patterson + Sheridan, LLP

(57) ABSTRACT

The present disclosure generally relates to a dual free layer two dimensional magnetic recording read head. The read head comprises a lower shield, a first sensor disposed over the first lower shield, a first rear hard bias (RHB) structure recessed from a media facing surface (MFS), a first upper shield disposed over the first sensor, a middle shield disposed over the first sensor at the MFS, a second sensor disposed over the middle shield, a second RHB structure recessed from the MFS, and an upper shield disposed over the second sensor. The middle shield has a U-like shape and a ratio of a width to a throat height of 6:1, where the throat height is less than or equal to about 2 μm. The first and second RHB structures each individually has a stripe height about 3 times greater than a stripe height of the middle shield.

19 Claims, 9 Drawing Sheets

(56) References Cited

U.S. PATENT DOCUMENTS

| | | | |
|---|---|---|---|
| 8,203,803 B2* | 6/2012 | Etoh et al. | G11B 5/3116 360/122 |
| 8,970,988 B1 | 3/2015 | Li et al. | |
| 9,117,474 B1* | 8/2015 | Contreras et al. | G11B 5/6076 |
| 9,147,404 B1* | 9/2015 | Luo et al. | G11B 5/3932 |
| 9,361,910 B2 | 6/2016 | McKinlay et al. | |
| 9,406,321 B2 | 8/2016 | Kief et al. | |
| 9,449,621 B1* | 9/2016 | Mauri et al. | G11B 5/3932 |
| 9,472,216 B1* | 10/2016 | Mauri et al. | G11B 5/3932 |
| 9,786,301 B1 | 10/2017 | Li et al. | |
| 10,395,678 B1* | 8/2019 | Rajauria et al. | G11B 5/6076 |
| 10,777,222 B1 | 9/2020 | Liu et al. | |
| 10,783,913 B1* | 9/2020 | Rajauria et al. | G11B 5/6076 |
| 11,087,785 B1 | 8/2021 | Mao et al. | |
| 11,170,809 B1 | 11/2021 | Mao et al. | |
| 2005/0190479 A1* | 9/2005 | Terris et al. | G11B 5/1278 360/59 |
| 2006/0000794 A1* | 1/2006 | Le | G11B 5/112 216/22 |
| 2007/0223142 A1* | 9/2007 | Takekuma et al. | G11B 5/3967 |
| 2008/0278855 A1* | 11/2008 | Guthrie et al. | G11B 5/3116 360/319 |
| 2009/0147410 A1* | 6/2009 | Jiang et al. | G11B 5/3116 360/319 |
| 2010/0091416 A1* | 4/2010 | Katada et al. | G11B 5/3906 360/324.11 |
| 2011/0116192 A1* | 5/2011 | Fujita et al. | G11B 5/3967 360/235.1 |
| 2016/0163338 A1* | 6/2016 | Ho et al. | G11B 5/3912 360/75 |
| 2016/0351213 A1 | 12/2016 | Rudy et al. | |
| 2017/0011759 A1 | 1/2017 | Ge et al. | |
| 2021/0390978 A1 | 12/2021 | Hu et al. | |

* cited by examiner

DFL TDMR MIDDLE SHIELD THROAT HEIGHT CONTROL FOR IMPROVED STABILITY

BACKGROUND OF THE DISCLOSURE

Field of the Disclosure

Embodiments of the present disclosure generally relate to a dual free layer (DFL) two-dimensional magnetic recording (TDMR) read head.

Description of the Related Art

Two-dimensional magnetic recording (TDMR) read heads generally have a first sensor, oftentimes referred to as a lower reader, and a second sensor, oftentimes referred to as an upper reader. The readers are spaced by a middle shield. Both the upper reader and the lower reader are substantially identical, each comprising two free layers to be dual free layer (DFL) readers or sensors. In DFL reader operation, the two free layers of each reader are individually stabilized longitudinally by an anti-ferromagnetically coupled (AFC) soft bias (SB) and biased transversally by a permanent magnet or a rear hard bias (RHB) structure from the stripe back edge of the sensor.

The middle shield between the upper and lower readers in TDMR read heads serves as a bottom shield for the upper reader. During operation, the middle shield may flip magnetization states due to magnetic domain movement of a notch in the middle shield disposed adjacent to the second reader, under either writer stress or external field disturbance. This existence of the notch comes out from an unavoidable deep etch nature during DFL sensor fabrication. The notch of the middle shield (and/or in the lower shield of the lower reader) switching magnetization states may change the biasing of a free layer of either the upper or lower reader, flip reader signal cross-track profile, and/or introduce position error signals (PES) error at servo writing and associated HDD failure.

Therefore, there is a need in the art for an improved TDMR read head, especially for DFL.

SUMMARY OF THE DISCLOSURE

The present disclosure generally relates to a dual free layer two dimensional magnetic recording read head. The read head comprises a lower shield, a first sensor disposed over the lower shield, a first rear hard bias (RHB) structure recessed from a media facing surface (MFS) by the first sensor, a first upper shield disposed over the first sensor, a middle shield disposed over the first upper shield, a second sensor disposed over the middle shield, a second RHB structure recessed from the MFS by the second sensor, and a second upper shield disposed over the second sensor. The middle shield has a U-like shape and a ratio of a width to a throat height of 6:1, where the throat height is less than or equal to about 2 µm. The first and second RHB structures each individually has a stripe height about 3 times greater than a stripe height of the middle shield.

In one embodiment, a read head comprises a lower shield, a first sensor disposed over the lower shield, a first upper shield disposed over the first sensor, and a middle shield disposed over the first upper shield, the middle shield comprising a first portion disposed at a media facing surface, a first leg coupled to the first portion, and a second leg coupled to the first portion, wherein a ratio of a width to a throat height of the middle shield is 6:1 or greater, the throat height being defined by a thickness of the first portion from the media facing surface.

In another embodiment, a read head comprises a lower shield, a first sensor disposed over the lower shield at a media facing surface (MFS), the first sensor comprising a first free layer and a second free layer, a first rear hard bias (RHB) structure recessed from the MFS by the first sensor a first upper shield disposed over the first sensor, a middle shield disposed over the first upper shield, wherein the first RHB has a stripe height about 3 times greater than a stripe height of the middle shield, a second sensor disposed over the middle shield, a second RHB structure recessed from the MFS by the second sensor, the second RHB having a stripe height about 3 times greater than a stripe height of the middle shield, and an second upper shield disposed over the second sensor.

In another embodiment, a dual free layer (DFL) two dimensional magnetic recording (TDMR) read head comprises a lower shield, a first sensor disposed over the lower shield at a media facing surface (MFS), the first sensor comprising a first free layer and a second free layer, a first rear hard bias (RHB) structure recessed from the MFS by the first sensor, a first upper shield disposed over the first sensor, a middle shield disposed over the first upper shield, the middle shield comprising a first portion disposed, a first leg coupled to the first portion, and a second leg coupled to the first portion, wherein the middle shield has a throat height less than or equal to about 2 µm, the throat height being defined by a thickness of the first portion from the media facing surface, a second sensor disposed over the middle shield, the second sensor comprising a first free layer and a second free layer, a second RHB structure recessed from the MFS by the second sensor, the second RHB having a stripe height greater than a stripe height of the middle shield, and a second upper shield disposed over the second sensor, the second upper shield having a stripe height greater than the second RHB structure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a dual free layer two dimensional magnetic recording read head. The read head comprises a lower shield, a first sensor disposed over the lower shield, a first rear hard bias (RHB) structure recessed from a media facing surface (MFS) by the first sensor, a first upper shield disposed over the first sensor, a middle shield disposed over the first sensor at the MFS, a second sensor disposed over the middle shield, a second RHB structure recessed from the MFS by the second sensor, and a second upper shield disposed over the second sensor. The middle shield has a U-like shape and a ratio of a width to a throat height of 6:1, where the throat height is less than or equal to about 2 μm. The first and second RHB structures each individually has a stripe height substantially longer than that of the middle shield with a height ratio over 3:1.

Figure 1:
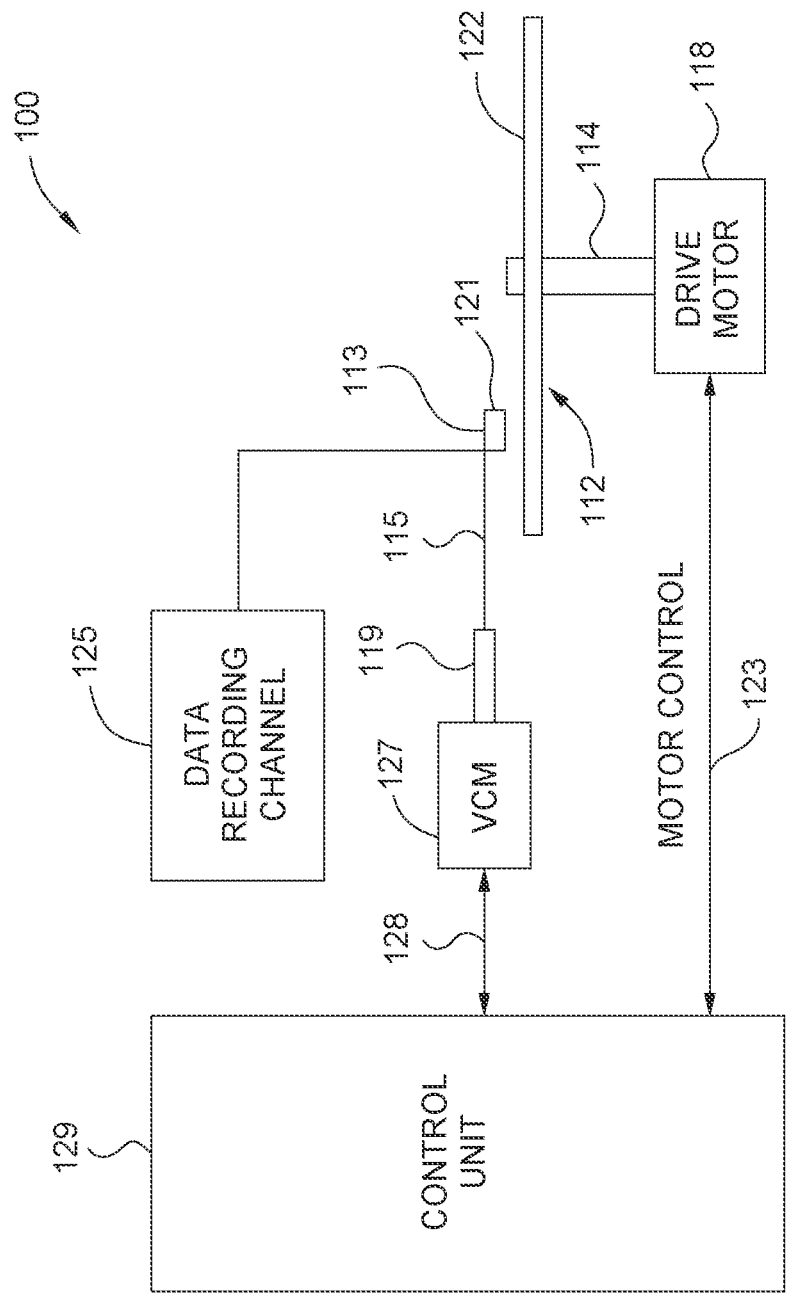
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
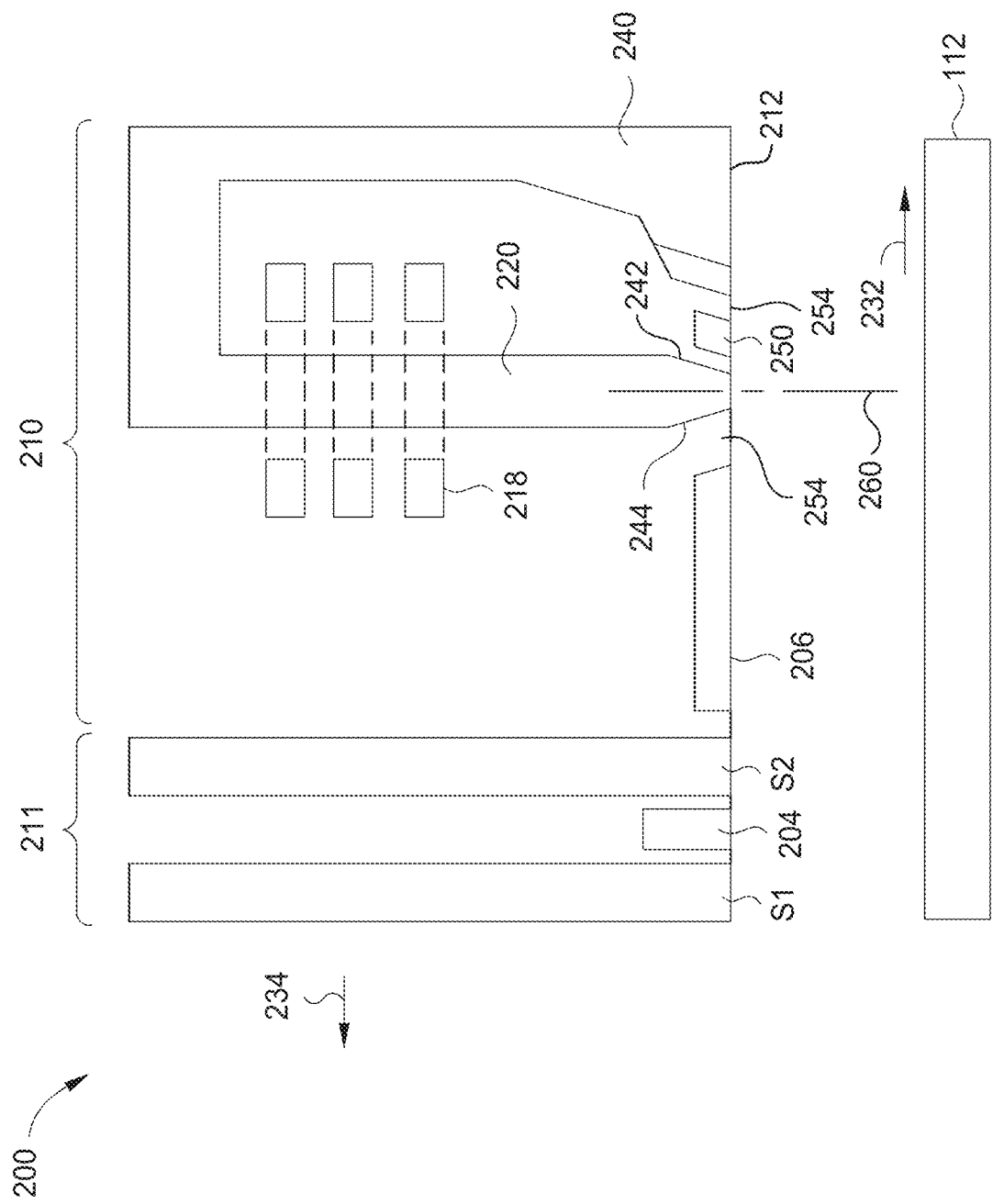
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits. Here, magnetic read head 211 is a simplified representation of the various disclosed embodiments which will include multiple sensing elements and shields as further described below.

The head assembly 200 includes a write head 210. In one embodiment, which can be combined with other embodiments, the write head 210 includes a main pole 220, a leading shield 206, a trailing shield (TS) 240, and optionally a spintronic device 250 (or other magnetic stack or conductive material) disposed between the main pole 220 and the TS 240. The main pole 220 serves as a first electrode. Each of the main pole 220, the spintronic device 250, the leading shield 206, and the trailing shield (TS) 240 can have a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

Figure 3A:
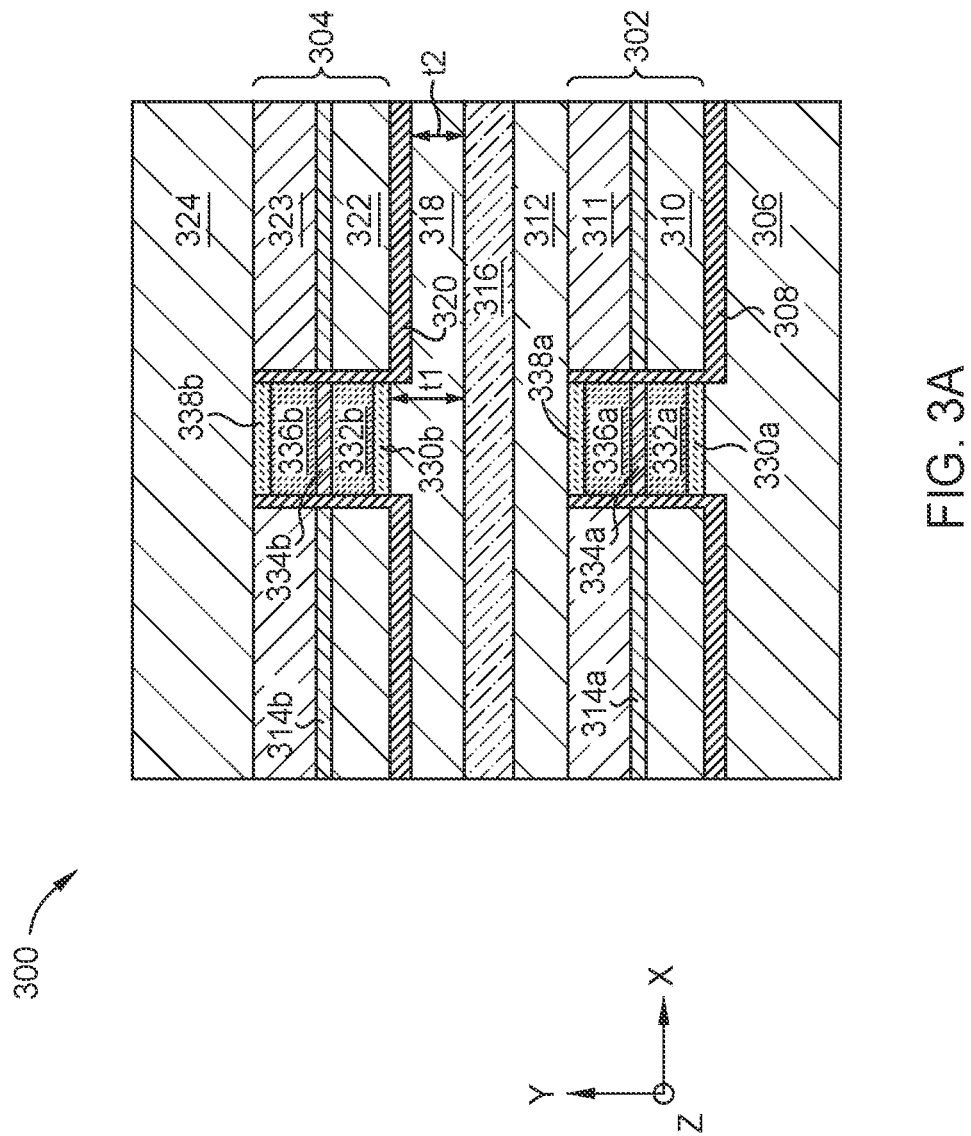
FIGS. 3A-3B illustrate various views of a conventional dual free layer (DFL) two dimensional magnetic recording (TDMR) read head comprising two sensors or readers, according to one embodiment.
Figure 3B:
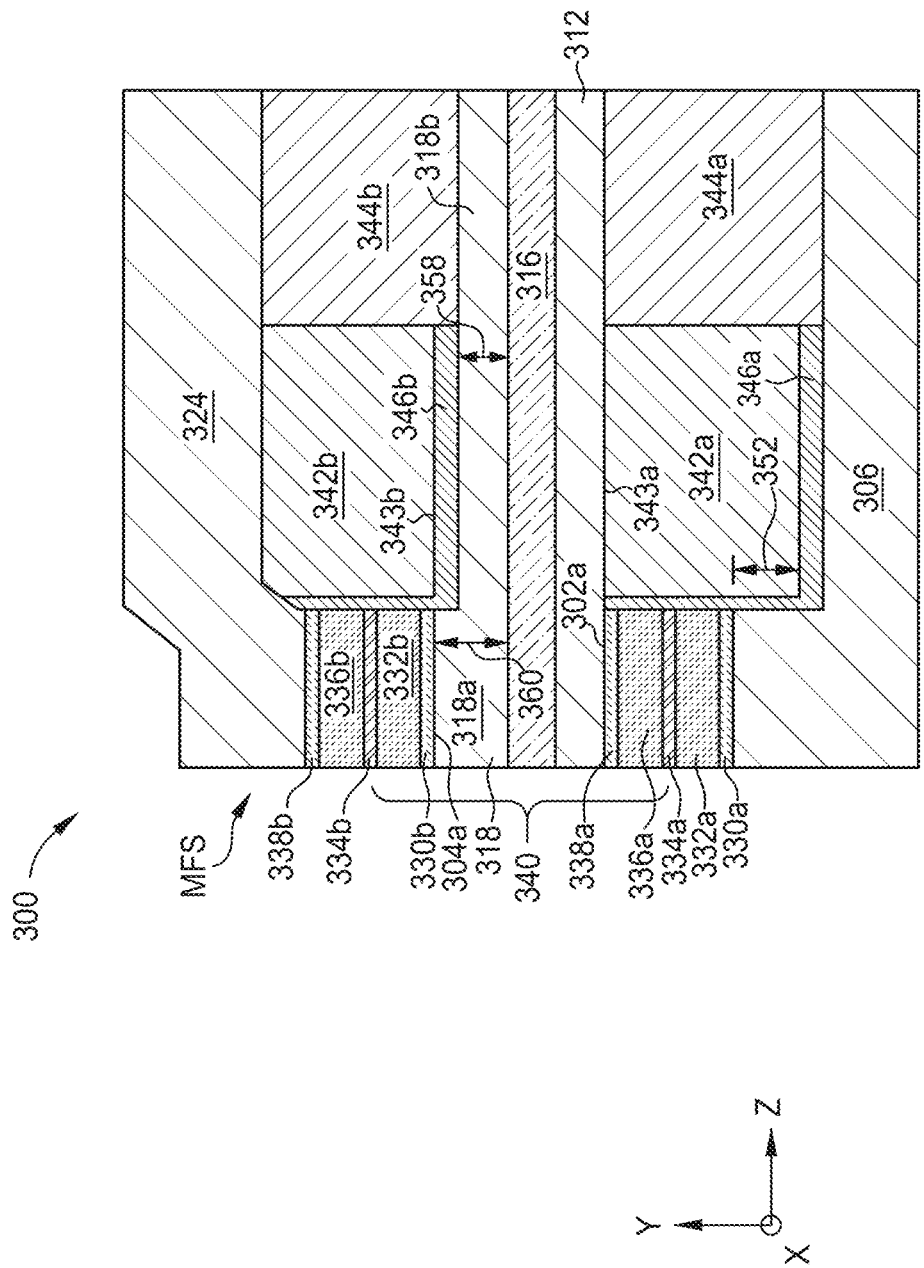

FIGS. 3A-3B illustrate various views of a dual free layer (DFL) two dimensional magnetic recording (TDMR) read head 300 comprising two sensors or readers 302, 304, according to one embodiment. FIG. 3A illustrates a media facing surface (MFS) view of the DFL TDMR read head 300, and FIG. 3B illustrates a cross-sectional view of the DFL TDMR read head 300.

The DFL TDMR read head 300 comprises a first lower shield 306, a first insulation layer 308 disposed on the first lower shield 306, a first sensor or reader 302 disposed on the first lower shield 306 between portions of the first insulation layer 308, a first upper shield 312 disposed over the first sensor 302, a read separation gap (RSG) 316 disposed on the first upper shield 312, a second lower shield 318 disposed on the RSG 316 a second insulation layer 320 disposed on the second lower shield 318, a second sensor or reader 304 disposed on the second lower shield 318 between portions of the second insulation layer 320, and a second upper shield 324 disposed over the second sensor 304. The second lower shield 318 may be referred to herein as a middle shield 318.

The RSG 316 may comprise $SiO_2$, AlOx, where x is an integer greater than or equal to 1, or a combination thereof. The first and second sensors 302, 304 may each individually be tunnel magnetoresistance (TMR) sensors or magnetic tunnel junction (MTJ) sensors. The first and second sensors 302, 304 may be interchangeably referred to as a first reader 302 and a second reader 304 throughout.

The first reader 302 comprises a seed layer 330a, a first free layer 332a disposed on the seed layer 330a, a barrier layer 334a disposed on the first free layer 332a, a second free layer 336a disposed on the barrier layer 334a, and a cap layer 338a disposed on the second free layer 336a. The second reader 304 comprises a seed layer 330b, a first free layer 332b disposed on the seed layer 330b, a barrier layer 334b disposed on the first free layer 332b, a second free layer 336b disposed on the barrier layer 334b, and a cap layer 338b disposed on the second free layer 336b.

A first soft bias layer 310 is disposed on the first insulation layer 308 for the first reader 302 and an anti-ferromagnetically coupled (AFC) layer 314a is disposed between the first soft bias layer 310 and a second soft bias layer 311. Similarly, a first soft bias layer 322 is disposed on the first insulation layer 320 for the second reader and an AFC layer 314b is disposed between the first soft bias layer 322 and a second soft bias layer 323. The first upper shield 312 and the second upper shield 324 may each individually comprise a magnetic material similar to the soft bias material, such as NiFe, NiFe/CoFe laminates, NiFe/NiFeCr laminates, or NiFe/W laminates, for example ("/" as used here denotes separate layers in a multi-layer stack). The first upper shield 312 and the second upper shield 324 may also each individually comprise a magnetic material similar to the soft bias material exchange biased by an antiferromagnet, such as IrMn, IrCrMn. The first upper shield 312 and the second upper shield 324 connect seamlessly to the second soft bias layers 311, 323, respectively. The first insulation layer 308 extends in the y-direction on each side of the first sensor 302 to prevent the first sensor 302 from contacting the first soft bias layer 310, the AFC layer 314a, and the second soft bias layer 311. Similarly, the first insulation layer 320 extends in the y-direction on each side of the second sensor 304 to prevent the second sensor 304 from contacting the second soft bias layer 323, and the AFC layer 314b, and the second soft bias layer 323. The AFC layers 314a and 314b comprise a CoFe/Ru/CoFe tri-layer.

As shown in FIG. 3B, a down-track spacing (DTS) 340 between the first barrier layer 334a of the first sensor 302 and the second barrier layer 334b of the second sensor 304 is about 60 nm to about 150 nm. A first rear hard bias (RHB) structure 342a is disposed behind the first reader 302, recessed from the MFS in the z-direction. A second insulation layer 346a is disposed between the first RHB structure 342a and the first reader 302, and between the first RHB structure 342a and the first lower shield 306. A third insulation layer 344a is disposed behind the first RHB structure 342a. The first, second, and third, insulation layers 308, 346a, and 344a may each individually comprise MgO, AlOx, SiNx, SiOx, and their laminates, where x is an integer greater than or equal to 1.

A first surface 343a of the first RHB structure 342a disposed adjacent to the first upper shield 312 is substantially flush or aligned with a first surface 302a of the first reader 302. In other words, the first RHB structure 342a and the second insulating layer 346a are substantially flush or aligned with the top surface 302a of the cap layer 338a of the first sensor 302 in the z-direction. The first RHB structure 342a of the read head 300 is recessed into the first lower shield 306 a distance 352 of about 15 nm to about 20 nm. Because the first RHB structure 342a is substantially flush or aligned with the first reader 302, the first upper shield 312 and the RSG 316 each extends substantially linearly along the x/z-axis from the MFS into the read head 300 such that the first upper shield 312 and the RSG 316 are planar.

A second RHB structure 342b is disposed behind the second reader 304, recessed from the MFS in the z-direction. A second insulation layer 346b is disposed between the second RHB structure 342b and the second reader 304, and between the second RHB structure 342b and the second lower shield 318. The third insulation layer 344b is disposed behind the second RHB structure 342b. A first surface 343b of the second RHB structure 342b is substantially flush or aligned with a first surface 304a of the second reader 304 in the z-direction. In other words, the second RHB structure 342b is substantially flush or aligned with the bottom surface 304a of the seed layer 330b of the second sensor 304 in the z-direction.

Additionally, because the first upper shield 312 and the RSG 316 of the DFL TDMR read head 300 are each planar or extend substantially linearly along the x-axis and z-axis, the second lower shield 318 comprises two portions of varying thicknesses. A first portion 318a of the second lower shield 318 disposed at the MFS adjacent to the second reader 304 has a first thickness 360 in the y-direction of about 20 nm to about 30 nm, and a second portion 318b of the second lower shield 318 disposed between the RSG 316 and the second insulation layer 344b has a second thickness 358 in the y-direction of greater than or equal to about 10 nm, such as about 15 nm to about 20 nm, resulting in a notch 419 (shown in FIG. 4) being formed at the MFS. The first portion 318a of the second lower shield 318 has a thickness (t1) viewed from MFS greater than a total thickness (t2) of the second lower shield 318 along both the x-direction and the z-direction.

Figure 4:
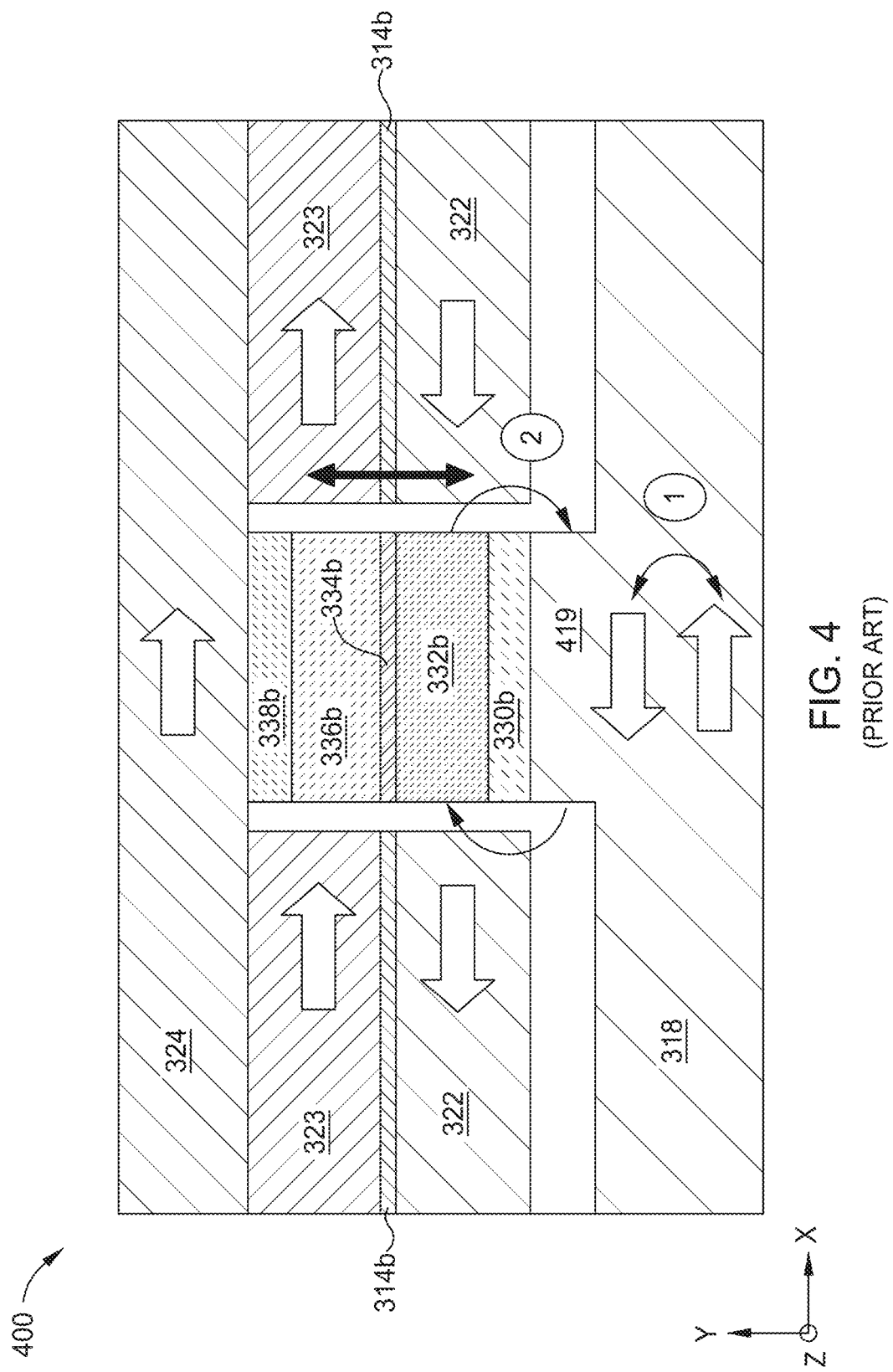
FIG. 4 illustrates a MFS view of a conventional DFL read head, according to one embodiment.

FIG. 4 illustrates a MFS view of a conventional DFL read head 400, according to one embodiment. Only the upper reader is shown in FIG. 4 for clarity. As shown in the DFL read head 400, the middle shield (MS) 318, which may be the second lower shield 318 of FIGS. 3A-3B, comprises a notch 419 disposed adjacent to the seed layer 330b. The notch 419 comprises the same material as the MS 318, and has a smaller width in the x-direction than the lower portion of the MS 318. The notch 419 is the result of the thickness differences of the first portion 318a and the second portion 318b of the second lower shield 318, as discussed above. During operation, the notch 419 of the MS 318 may flip magnetization states (as shown by the two horizontal arrows labeled "1") from magnetic domain movement of the notch 419, under either writer stress or external field disturbance. The notch 419 switching magnetization states may change the free layer 332b biasing (as shown by the arrows labeled "2"), flip reader signal cross-track profile, and/or introduce position error signals (PES) error at servo writing, user data writing, and associated HDD failure.

Figure 5:
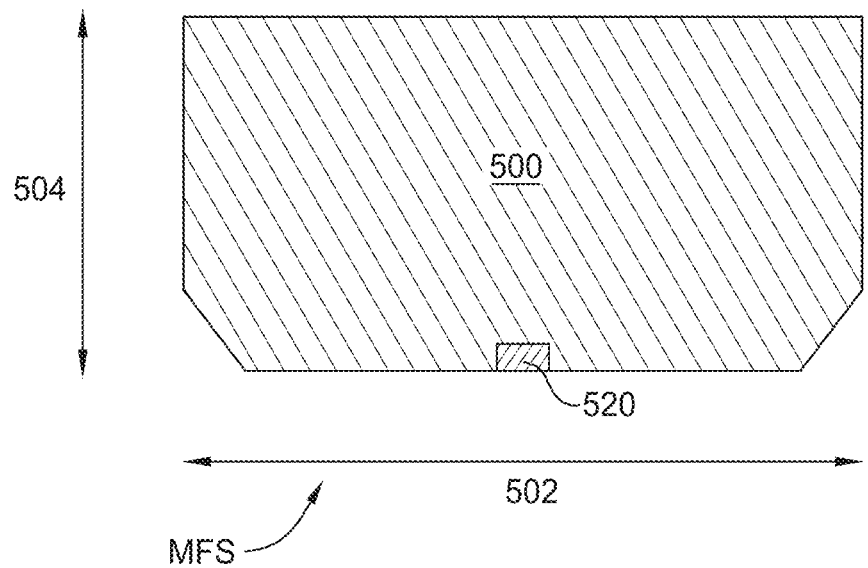
FIG. 5 illustrates a top view of a conventional middle shield (MS).

FIG. 5 illustrates a top view of a conventional middle shield (MS) 500, which is disposed over a second lower shield, such as the second lower shield 318 of FIGS. 3A-3B. A reader 520, such as the upper reader 304 of FIGS. 3A-3B, is disposed over the MS 500 at the MFS.

The MS 500 is substantially flat or planar and has a rectangular shape. In some embodiments, the corners of the MS 500 disposed at the MFS may be angled or chamfered. The MS 500 has a width 502 in the x-direction at the MFS of about 10 μm and a throat height 504 in the z-direction of about 5 μm. A ratio of the width 502 to the throat height 504 is about 2:1. Due to the small aspect ratio of the width to throat height of the MS 500, and hence the weaker shape anisotropy, the instability due to magnetization domain movement/fluctuation of the MS 500 is increased. Magnetization flip of the MS 500 or the notch (not shown) of the MS 500, from magnetic domain movement of the notch (not shown) of the MS 500, under either writer stress or external field disturbance, may change the free layer biasing, flip reader signal cross-track profile, and/or introduce position error signals (PES) error at servo writing, user data writing, and associated HDD failure.

Figure 6:
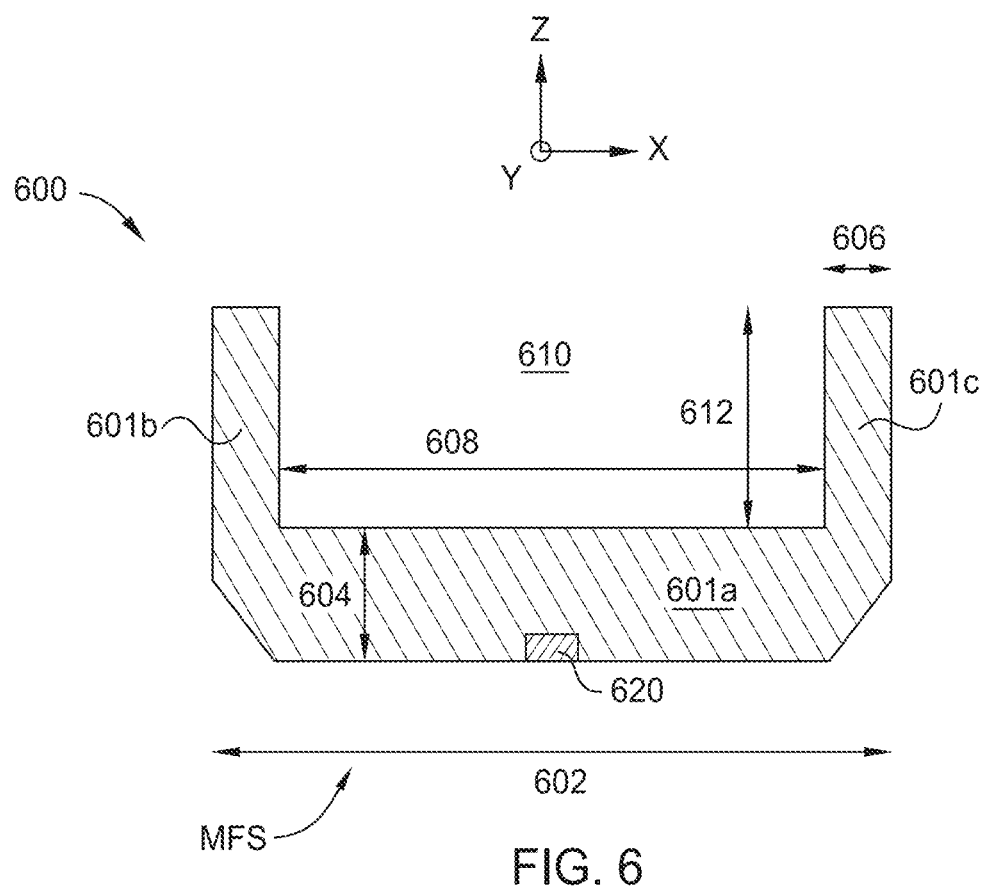
FIG. 6 illustrates a top view of a middle shield (MS), according to one embodiment.

FIG. 6 illustrates a top view of a middle shield (MS) 600, according to one embodiment. The MS 600 is disposed over a second lower shield, such as the second lower shield 318 of FIGS. 3A-3B. As such, the MS 600 may be a part of the DFL TDMR read head 300 of FIGS. 3A-3B. A reader 620, such as the upper reader 304 of FIGS. 3A-3B, is disposed over the MS 600 at the MFS.

The MS 600 is substantially flat or planar, and has a U-like shape such that a central portion 610 of the MS 600 is removed and replaced with an insulating material, such as AlOx, SiOx, MgO, HfOx, SiN, and their laminates, where x is an integer greater than or equal to 1. In some embodiments, the corners of the MS 600 disposed at the MFS may be angled or chamfered. The MS 600 comprises a front portion 601a disposed at the MFS and two legs 601b, 601c coupled to the front portion 601a. The removed central portion 610 (i.e., the insulating material) has a width 608 in the x-direction of about 10 μm and a height 612 in the z-direction of about 4 μm. Each leg 601b, 601c has a width 606 in the x-direction of about 1 μm.

The front portion 601a has a width 602 in the x-direction of about 12 μm and a throat height 604 in the z-direction from the MFS to the removed central portion 610 of about 0.4 μm to about 2.0 μm (i.e., less than half the throat height 504 of the MS 500). As such, the MS 600 has a ratio of the width (w) 602 to the throat height (t) 604 (w/t) equal to or greater than about 6:1. Note that the height of the MS legs 601b, 601c is not counted due to the fact that the MS legs 601b, 601c are further away from the active region where the reader 620 is located and magnetization/domain state of the MS legs 601b, 601c has no impact to head operation. Thus, the ratio of the width 602 to the throat height 604 of the MS 600 is higher than the ratio of the width 502 to the throat height 504 of the conventional MS 500 of FIG. 5. With reduction of the MS 600 throat height 604, and hence a larger aspect ratio of width to throat height, the magnetization domain movement/fluctuation of the MS 600 or the notch (not shown) of the MS 600 is suppressed and the MS 600 is stabilized by utilizing stronger shape anisotropy.

Figure 7:
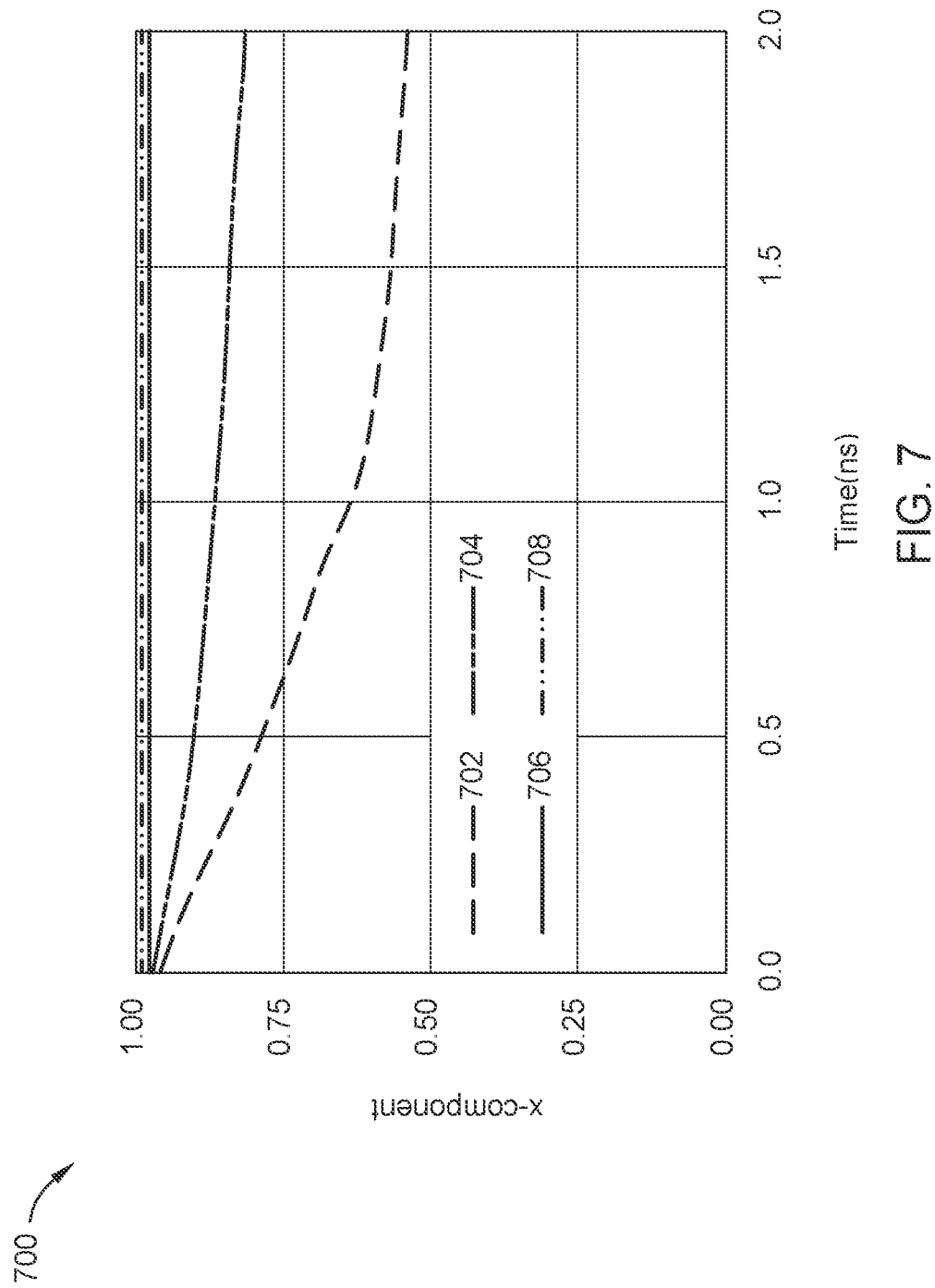
FIG. 7 illustrates a graph of a cross-track component of the magnetization or domain state of the MS of FIG. 6 versus time in ns, according to one embodiment.

FIG. 7 illustrates a graph 700 of a cross-track component of the averaged magnetization indicating domain movement of the MS 600 directly underneath the second reader 304 (i.e., under the first free layer 332b in FIG. 4) of FIG. 6 versus time in ns under a longitudinal field disturbance of −300Oe, according to one embodiment. In the graph 700, line 702 represents a conventional MS, such as the MS 500 of FIG. 5, having a throat height of about 5 μm, line 704 represents the MS 600 having a throat height of about 2.4 μm, line 706 represents the MS 600 having a throat height of about 0.8 μm, and line 708 represents the MS 600 having a throat height of about 0.4 μm.

As shown in the graph 700 by line 702, the average magnetization MS 500 having a throat height of about 5 μm decrease over time, indicating that the MS 500 experiences several domain motions or magnetization changes from external field disturbance. As shown by lines 706 and 708, the MS 600 having a throat height of about 0.4 µm to about 0.8 µm, remains stabilized and closer to the initial state over time during operation, indicating that the domain state or magnetization does not change or flip. Thus, the MS 600 having a throat height less than or equal to about 2.0 µm, or a larger aspect ratio of width to throat height, suppresses the magnetization domain movement/fluctuation of the MS 600 during operation.

Figure 8:
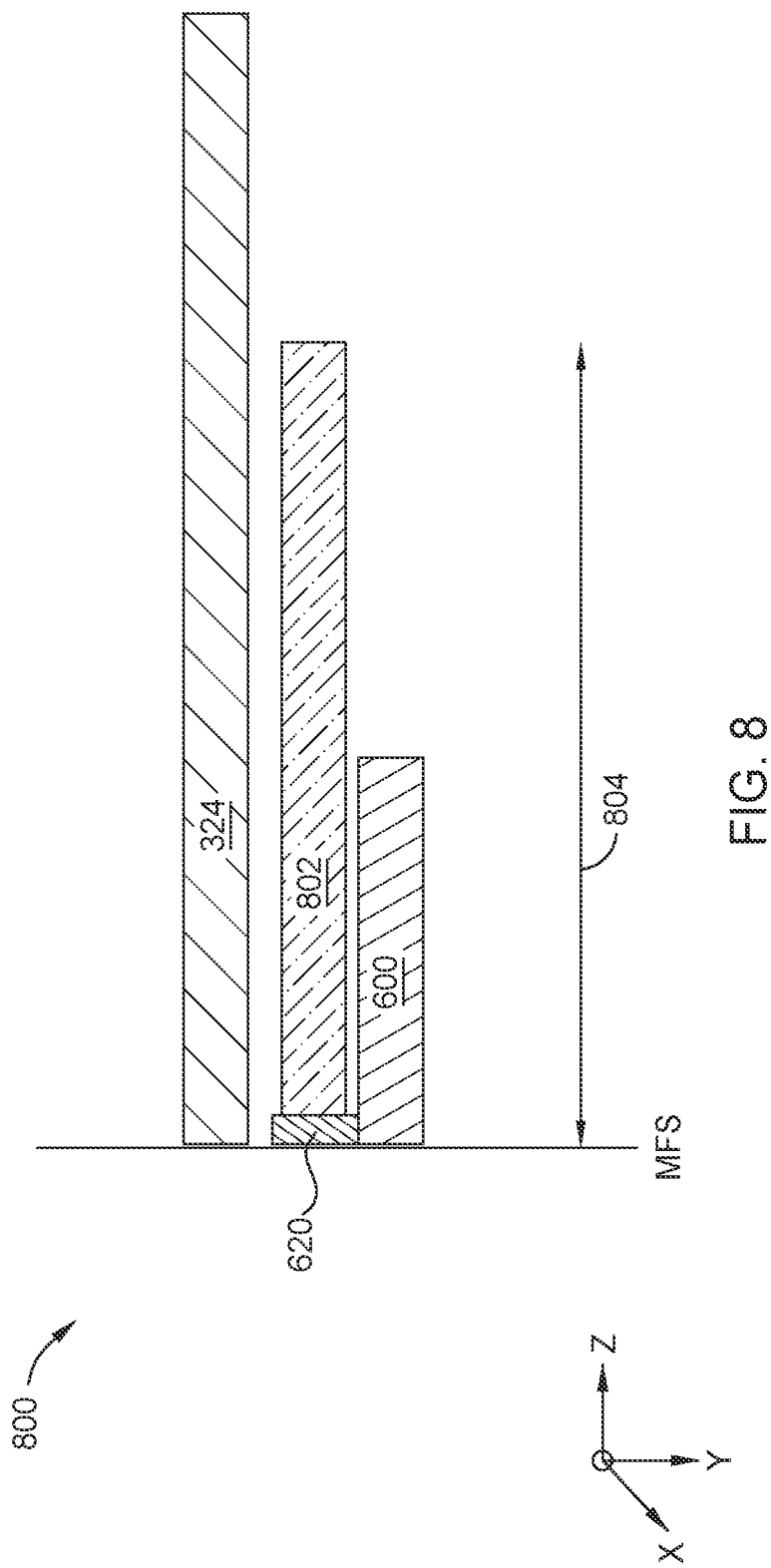
FIG. 8 illustrates a side view of an upper reader of a DFL TDMR read head, according to one embodiment.

FIG. 8 illustrates a side view of an upper reader 800 of a DFL TDMR read head, according to one embodiment. The upper reader 800 may be a part of the DFL TDMR read head 300 of FIGS. 3A-3B. The upper reader 800 may comprise the MS 600 and the reader 620 of FIG. 6. The upper reader 800 comprises a RHB structure 802, which may be the RHB structure 342b of FIGS. 3A-3B.

The RHB structure 802 is recessed from the MFS and is disposed behind the reader 620. The RHB structure 802 has a stripe height 804 in the z-direction of about 1.4 µm to about 2 µm, such as about 1.6 µm. The stripe height 804 of the RHB structure 802 is substantially greater than a stripe height of the MS 600, which is about 0.5 µm, and less than the stripe height of the second upper shield 324, which is about 10 µm. Typically, conventional read heads have a much shorter stripe height for the RHB, such as about 0.5 µm. Magnetization of the MS 600 can be further disturbed due to the close proximity of the RHB structure 802. By extending the stripe height 804 of the RHB structure 802 to be substantially greater than the stripe height of the MS 600, such as about 3 times greater (i.e., a ratio of the stripe height of the RHB structure 802 to the stripe height of the MS 600 is greater than 3:1), interaction between the MS 600 and the RHB structure 802 is reduced, resulting in a more stable domain for the middle shield 600.

While FIG. 8 only illustrates an upper reader 800, the DFL TDMR read head may comprises a lower reader disposed below the MS 600. In such an embodiment, the lower shield 306 would have the same stripe height as the upper shield 324, and a second RHB structure, such as the RHB structure 342a of FIGS. 3A-3B, would be disposed behind the first sensor 302 and have the same stripe height 804.

Figure 9A:
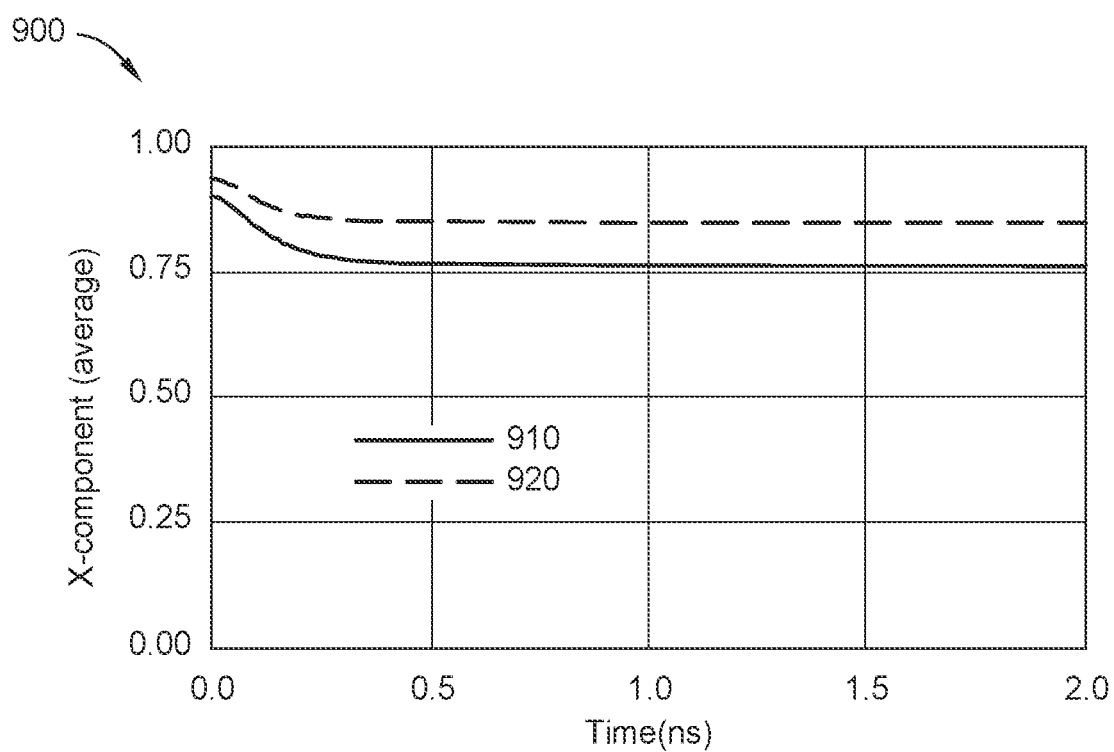
FIG. 9A illustrates a graph of a cross-track component of the magnetization or domain state of the MS of FIG. 8 versus time in ns, according to one embodiment.
Figure 9B:
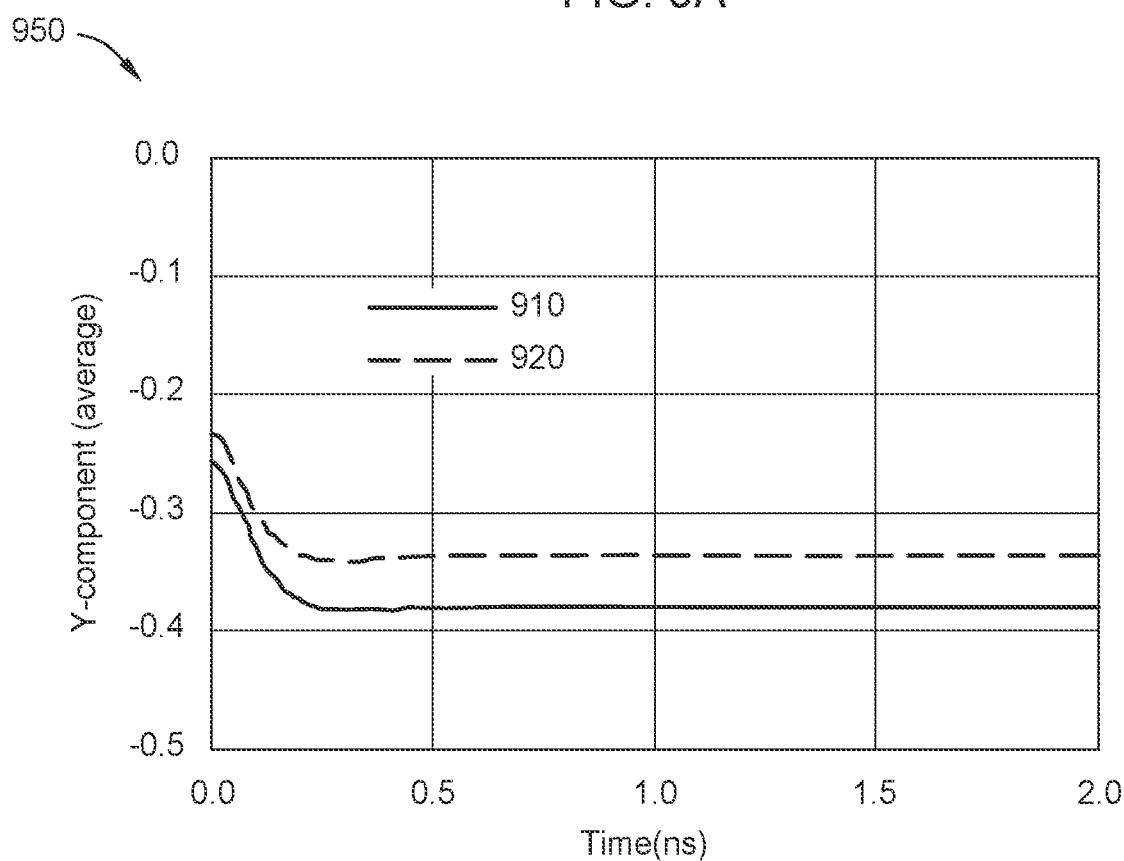
FIG. 9B illustrates a graph of a down-track component of the magnetization or domain state of the MS of FIG. 8 versus time in ns, according to one embodiment.

FIG. 9A illustrates a graph 900 of a cross-track (i.e., the x-direction of FIG. 8) component of the average magnetization of the MS 600 below the sensor 620 of FIG. 8 versus time in ns, according to one embodiment. FIG. 9B illustrates a graph 950 of a down-track (i.e., the y-direction of FIG. 8) component of the magnetization of the MS 600 of FIG. 8 versus time in ns, according to one embodiment.

In both graphs 900, 950, line 910 represents a RHB structure having a stripe height of about 0.5 µm disposed behind the MFS and a MS 600 height of about 0.5 µm, and line 920 represents the RHB structure 802 of FIG. 8 having a stripe height ratio of 3:1 with the MS 600, such as a stripe height 804 of about 1.4 µm to about 2 µm. As shown in the graph 900 by the line 920, during operation, the RHB structure 802 of FIG. 8 having a stripe height ratio of 3:1 with the MS 600 results in a larger cross-track component (closer to 1, meaning little to no change) and a more stable magnetization or domain state. Similarly, as shown in the graph 950 by the line 920, during operation, the RHB structure 802 of FIG. 8 having a stripe height ratio of 3:1 with the MS 600 also results in a closer-to-zero and less out-of-plane component and a more stable magnetization or domain state than a conventional shorter stripe height RHB structure.

In one embodiment, a read head comprises a lower shield, a first sensor disposed over the lower shield, a first upper shield disposed over the first sensor, and a middle shield disposed over the first upper shield, the middle shield comprising a first portion disposed at a media facing surface, a first leg coupled to the first portion, and a second leg coupled to the first portion, wherein a ratio of a width to a throat height of the middle shield is 6:1 or greater, the throat height being defined by a thickness of the first portion from the media facing surface.

The throat height of the middle shield is less than or equal to about 2 µm. The read head further comprises a second sensor disposed over the middle shield, and a second upper shield disposed over the second sensor, wherein the first sensor and the second sensor each individually comprises a first free layer and a second free layer. The first portion, the first leg, and the second leg of the middle shield form a U-like shape. The read head further comprises an insulating material disposed between the first leg and the second leg. The first leg and the second leg each individually has a height of about 4 µm and a width of about 1 µm. A magnetic recording device comprises the read head.

In another embodiment, a read head comprises a lower shield, a first sensor disposed over the lower shield at a media facing surface (MFS), the first sensor comprising a first free layer and a second free layer, a first rear hard bias (RHB) structure recessed from the MFS by the first sensor, a first upper shield disposed over the first sensor, a middle shield disposed over the first upper shield, wherein the first RHB has a stripe height about 3 times greater than a stripe height of the middle shield, a second sensor disposed over the middle shield, a second RHB structure recessed from the MFS by the second sensor, the second RHB having a stripe height about 3 times greater than a stripe height of the middle shield, and an upper shield disposed over the second sensor.

The middle shield has a throat height less than or equal to about 2 µm. The middle shield comprises a first portion disposed at a media facing surface, a first leg coupled to the first portion, and a second leg coupled to the first portion, wherein a ratio of a width to a throat height of the middle shield is 6:1 or greater, the throat height being defined by a thickness of the first portion from the media facing surface. The upper shield has a stripe height greater than the stripe height of the second RHB structure. The stripe height of the upper shield is about 10 µm. The stripe height of the lower shield is equal to the stripe height of the upper shield. A magnetic recording device comprises the read head.

In another embodiment, a dual free layer (DFL) two dimensional magnetic recording (TDMR) read head comprises a lower shield, a first sensor disposed over the lower shield at a media facing surface (MFS), the first sensor comprising a first free layer and a second free layer, a first rear hard bias (RHB) structure recessed from the MFS by the first sensor, a first upper shield disposed over the first sensor, a middle shield disposed over the first upper shield, the middle shield comprising a first portion disposed, a first leg coupled to the first portion, and a second leg coupled to the first portion, wherein the middle shield has a throat height less than or equal to about 2 µm, the throat height being defined by a thickness of the first portion from the media facing surface, a second sensor disposed over the middle shield, the second sensor comprising a first free layer and a second free layer, a second RHB structure recessed from the MFS by the second sensor, the second RHB having a stripe height greater than a stripe height of the middle shield, and a second upper shield disposed over the second sensor, the upper shield having a stripe height greater than the second RHB structure.

A ratio of a width to a throat height of the middle shield is 6:1 or greater. The first RHB structure has a stripe height greater than the middle shield, and wherein the lower shield has a stripe height greater than the first RHB structure. The first RHB structure and the second RHB each individually has a stripe height about 3 times greater than a stripe height of the middle shield. The first portion, the first leg, and the second leg form a U-like shape, and an insulating material is disposed between the first leg and the second leg. A magnetic recording device comprises the DFL TDMR read head.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
   a lower shield;
   a first sensor disposed over the lower shield;
   a first upper shield disposed over the first sensor;
   a middle shield disposed over the first upper shield, the middle shield comprising a first portion disposed at a media facing surface, a first leg coupled to the first portion, and a second leg coupled to the first portion, wherein a ratio of a width to a throat height of the middle shield is 6:1 or greater, the throat height being defined by a thickness of the first portion from the media facing surface;
   a second sensor disposed over the middle shield, wherein the first sensor and the second sensor each individually comprises a first free layer and a second free layer; and
   a second upper shield disposed over the second sensor.

2. The read head of claim 1, wherein the throat height of the middle shield is less than or equal to about 2 µm.

3. The read head of claim 1, wherein the first portion, the first leg, and the second leg form a U-like shape.

4. The read head of claim 3, further comprising an insulating material disposed between the first leg and the second leg.

5. The read head of claim 1, wherein the first leg and the second leg each individually has a height of about 4 µm and a width of about 1 µm.

6. A magnetic recording device comprising the read head of claim 1.

7. A read head comprising:
   a lower shield;
   a first sensor disposed over the lower shield at a media facing surface (MFS), the first sensor comprising a first free layer and a second free layer;
   a first rear hard bias (RHB) structure recessed from the MFS by the first sensor;
   a first upper shield disposed over the first sensor;
   a middle shield disposed over the first upper shield, wherein the first RHB has a stripe height about 3 times greater than a stripe height of the middle shield;
   a second sensor disposed over the middle shield;
   a second RHB structure recessed from the MFS by the second sensor, the second RHB having a stripe height about 3 times greater than the stripe height of the middle shield; and
   a second upper shield disposed over the second sensor.

8. The read head of claim 7, wherein the middle shield has a throat height less than or equal to about 2 µm.

9. The read head of claim 7, wherein the middle shield comprises a first portion disposed at the media facing surface, a first leg coupled to the first portion, and a second leg coupled to the first portion, wherein a ratio of a width to a throat height of the middle shield is 6:1 or greater, the throat height being defined by a thickness of the first portion from the media facing surface.

10. The read head of claim 7, wherein the second upper shield has a stripe height greater than the stripe height of the second RHB structure.

11. The read head of claim 7, wherein a stripe height of the second upper shield is about 10 µm.

12. The read head of claim 11, wherein a stripe height of the lower shield is equal to the stripe height of the second upper shield.

13. A magnetic recording device comprising the read head of claim 7.

14. A dual free layer (DFL) two dimensional magnetic recording (TDMR) read head, comprising:
    a lower shield;
    a first sensor disposed over the lower shield at a media facing surface (MFS), the first sensor comprising a first free layer and a second free layer;
    a first rear hard bias (RHB) structure recessed from the MFS by the first sensor;
    a first upper shield disposed over the first sensor;
    a middle shield disposed over the first upper shield, the middle shield comprising a first portion disposed at the MFS, a first leg coupled to the first portion, and a second leg coupled to the first portion, wherein the middle shield has a throat height less than or equal to about 2 µm, the throat height being defined by a thickness of the first portion from the MFS;
    a second sensor disposed over the middle shield, the second sensor comprising a first free layer and a second free layer;
    a second RHB structure recessed from the MFS by the second sensor, the second RHB having a stripe height greater than a stripe height of the middle shield; and
    a second upper shield disposed over the second sensor, the second upper shield having a stripe height greater than the second RHB structure.

15. The DFL TDMR read head of claim 14, wherein a ratio of a width to the throat height of the middle shield is 6:1 or greater.

16. The DFL TDMR read head of claim 14, wherein the first RHB structure has a stripe height greater than the middle shield, and wherein the lower shield has a stripe height greater than the first RHB structure.

17. The DFL TDMR read head of claim 14, wherein the first RHB structure and the second RHB each individually has a stripe height about 3 times greater than the stripe height of the middle shield.

18. The DFL TDMR read head of claim 14, wherein the first portion, the first leg, and the second leg form a U-like shape, and wherein an insulating material is disposed between the first leg and the second leg.

19. A magnetic recording device comprising the DFL TDMR read head of claim 15.

* * * * *